Aug. 27, 1968    TORU KATSUMURA ET AL    3,398,484
CAR DOOR ACTUATOR

Filed Feb. 2, 1966    5 Sheets-Sheet 1

T. Katsumura,
S. Morita, T. Ozeki,
K. Tamaoki and    INVENTORS
S. Mori
BY Wenderoth, Lind
and Ponack,
Attorneys

3,398,484
CAR DOOR ACTUATOR
Toru Katsumura, 833 Kugaharamachi, Ota-ku; Shosuke Morita, 33–15 1-chome, Hakusan, Bunkyo-ku; Tokutaro Ozeki, 6 4-chome, Honkamata, Ota-ku; Kazuo Tamaoki, 33–15 1-chome, Hakusan, Bunkyo-ku; and Sosaku Mori, 15 3-chome, Kanamecho, Toshima-ku, all of Tokyo, Japan
Filed Feb. 2, 1966, Ser. No. 524,611
Claims priority, application Japan, June 4, 1965, 40/32,667
7 Claims. (Cl. 49—138)

ABSTRACT OF THE DISCLOSURE

A door actuator arrangement, comprising a D.C.-drive motor having field windings and an armature and adapted to be mounted within the interior of the door, a current source for feeding said motor, motion-converting means connected to the motor for the conversion of the rotational movement of the motor into a linear motion, a transmission mechanism linked with said means and transmitting said converted linear motion to the door for opening and closing the latter, a multi-contact multi-position switch assembly electrically connected between said motor and said current source, a plurality of relays electrically connected with the contacts of said switch, and a multi-stage resistor connected between said field windings and said armature, said switch assembly, resistor and relays being connected for making the armature current supplied from said current source the strongest when the switch is manipulated to a first position in the door-opening direction at the initiation of the door-opening and then the armature current is weakened when the switch is moved to at least one subsequent position.

---

This invention relates to improvements in and relating to car door actuators. More specifically, it relates to improved car door actuator arrangements driven by a D.C.-motor housed in the interior of the car door, being employed in place of the conventional hydraulic piston-and-cylinder unit.

It is commonly known that in the above kind of the car door actuator there must be provided a perfectly functioning door lock which should be actuated when the car door has been brought into its closed position and can be effectively released from the locking position when the door is about to be opened. At the same time, the door actuator must provide optimal door-opening and closing velocities and torques. More specifically, the door actuator must start the drive motor each time when the door is either to be opened or closed, and (in addition, the door lock must be tripped in the releasing direction when the door is actuated to open. For this purpose, the drive motor must provide a considerably large torque at the time of door-opening operation.

It is a further requisite requirement for the door actuator that with the door lock thus tripped, the door opening operation should be carried into effect perfectly and successfully in the course of a reasonable time period which will never cause the driver and the like personnel to feel a psychological slow-down.

With a higher operating speed allotted to the drive motor for providing a higher door opening speed, the door will represent a larger kinetic energy at the moment of full opening thereof and will give rise to an impact or shocking operation of the door, thereby an excessive impact force being impressed upon the hinge connection of the latter and a possible damage of the hinges being liable to occur. If a person should stand within the operating range of the door in this case, a physical damage will be invited to the person. Therefore, the door opening speed after the release of the door lock should preferably be kept at a relatively slow speed. The necessary torque in the course of this door-opening stage must be at a highly small value in comparison with that which is required at the initiating stage of the door-opening operation.

On the other hand, the door closing speed in advance of the complete closure of the door should be of a relatively small value in order to provide a safety against possible human physical damage, but the speed must be of a larger value so as to avoid the driver and the like personnel from feeling a retarded and slow-down opening operation of the door. In this case, the necessary torque for performing such a door-closing operation is of a relatively small value. At the completely closing moment of the door, the door should have a larger speed or torque or a larger amount of kinetic energy for carrying out the engagement of the door lock. The final or remaining kinetic energy may well be absorbed by the buffering means such as rubber cushions or the like, without inviting damage in the door hinges.

The functional requirements so far described are those necessary for the opening and closing operation of the car doors and these are sufficient when the operation is carried out while the car is on an even ground surface.

If, however, the car stops on a sloped ground surface, further additional and complicated requirements should be satisfied in the manipulation of the car door.

When the car chassis is laterally inclined and the door to be actuated be at a higher level than the opposite one, or the car is longitudinally inclined on an elevatingly sloped road as an example so that the hinged connection of the door is at a higher level than the respective door lock, a considerably larger torque is desired even after release of the latter, so as to overcome the opposingly influencing gravity action. In this case, a possible closure of the door under the influence of the gravity should be effectively prevented and thus the opened door must be kept at its operated position. In the door-closing operation under these gravity conditions, a braking effort must be applied for the prevention of an excessive acceleration of the door to take place.

When the car is oppositely inclined on an uneven ground surface to those mentioned above, counter measures should be taken into consideration substantially in the opposite manner to that described hereinabove.

The conventional door actuators can not meet the aforementioned general and additional requirements in a satisfying manner.

The main object of the present invention is to provide a highly improved, motorized car door actuator which is capable of satisfying the aforementioned highly complicated torque and speed requirements as met under various operating and ground conditions.

This object is achieved by providing a door actuator arrangement, comprising a D.C.-drive motor having field windings and an armature and adapted to be mounted within the interior of the door, a current source for feeding said motor, motion-converting means connected to the motor for the conversion of the rotational movement of the motor into a linear motion, a transmission mechanism linked with said means and transmitting said converted linear motion to the door for opening and closing the latter, a multi-contact multi-position switch assembly electrically connected between said motor and said current source, a plurality of relays electrically connected with the contacts of said switch, and a multi-stage resistor connected between said field windings and said armature, said switch assembly, resistor and relays being connected for making the armature current supplied from said current source the strongest when the switch is manipulated to a first position in the door-opening direction at the initiation of the door-opening, and then the armature current is weakened when the switch is moved to at least one subsequent position.

Further additional objects of the present invention will be easily understood as the description proceeds.

In the accompanying drawings, illustrative of a preferred embodiment of the invention.

Figure 1:
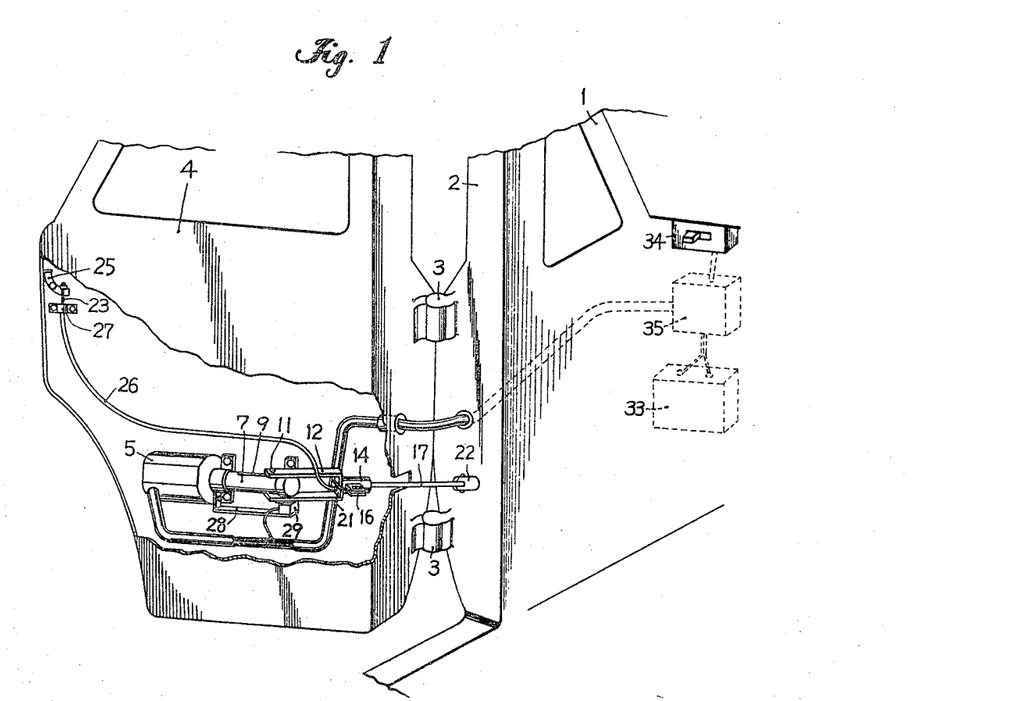
FIG. 1 is a perspective view, partly broken away, of the motorized door actuator.

Now referring to the accompanying drawings, especially FIG. 1 thereof, numeral 1 denotes a part of car chassis, to which a supporting member 2 is rigidly connected, a car door 4 being pivotably connected with the last mentioned member 2 by means of a plurality of hinges as at 3 and a D.C.-motor 5 being mounted in the interior space of the door. The motor is provided with a motor shaft 6 which is mechanically connected with a lead screw 8 so as to rotate in unison therewith, said lead screw being housed in a cylindrical member 7 with ample plays for free rotation. The cylindrical member is rigidly connected with the motor housing, as most clearly seen in FIG. 2. Nut member 10 is kept in meshing with the lead screw and provided with a pair of oppositely directing guide pins 11 rigidly fixed on the nut, said pins being slidably guided in a pair of parallel guide slots 9 formed in the wall of cylindrical member 7. An elongated, substantially channel-shaped member 12 is kept at its one end in pivotable connection with the guide pins 11. On the bottom surface of the lower chord of the member 12 and in a close proximity of the free end of cylindrical member 7, there is provided a switch actuator 13 preferably in the form of a plate fixedly attached to the channel 12. A further cylindrical member 14 is fixedly attached to the web end of the channel 7, said member 14 mounting in turn fixedly an anchoring member 16 which is formed with an elongated eye 15 for receiving an extremity of cable 23. 17 denotes a pusher rod which passes through the cylinder 14 and formed rigidly at an intermediate point thereof between the both extremities a slidable piston 19 guided in the cylinder. An urging coil spring 18 is inserted in the cylinder 14 under tension so as to provide a resiliently urging force upon the pusher 17 directing in the right-hand direction when seen in FIGS. 1–3. The nearest end of the pusher rod 17 to the motor 5 passes slidably through the web of channel 12 and a bracket member 21 is fixedly attached to the end of pusher rod 17 by means of a fixing nut 20, while the opposite end of the pusher 17 is fixedly attached to a suitably selected point on the support member 2 of chassis 1 by means of a fixture 22. The lower end of cable 23, as seen in FIG. 1 is provided with a stopper rod 24 which is slidably guided along the elongated eye 15. The cable 23 passes slidably through the interior of guide tube 26 and the upper extremity of the cable, as most clearly seen from FIG. 1, is connected to a lock lever 25, said tube being connected at its upper end with a fixture 27 mounted in turn fixedly on the door 4 and at its lower end with the bracket 21, as the latter being most clearly seen from FIG. 3.

In parallel to the first cylinder 7, an elongated angle member 28 is provided and the root end thereof is fixedly attached to the motor housing, while on the free end of the member 28 there is provided a limit switch 29 fixedly mounted thereon. A pivotable switch-operating resilient member 31 is provided on the switch for on-off control of the latter and kept in contact with a push button 32 for this purpose. The member 31 is provided with a follower roller 30 so as to be actuated upon by the actuator plate 13 already referred to.

Figure 2:
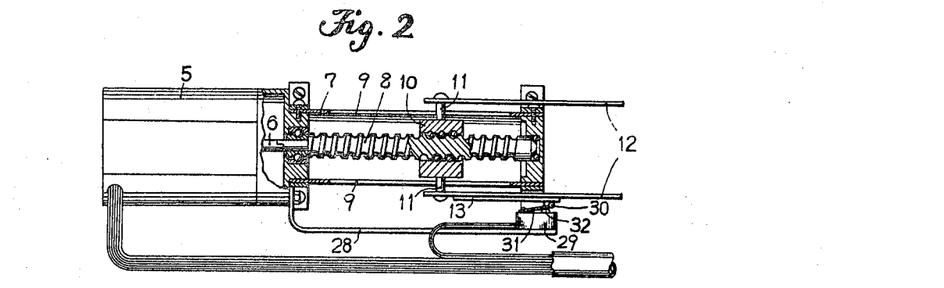
FIG. 2 is a partially sectional front view of a part of the actuator, comprising the drive motor and a lead screw directly coupled therewith.
Figure 3:
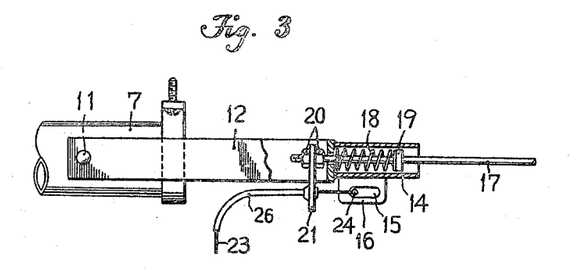
FIG. 3 is a partially sectioned side view of a door lock triggering mechanism employed in the actuator.

When the follower roll 30 is brought into contact with actuator plate 13 as illustrated in FIG. 2, button 32 is depressed and thus the limit switch 29 is turned to "on." On the contrary, when the member 12 is shifted in the right-hand direction in FIGS. 1–3 as will be more fully described hereinafter, thus the follower roller being disengaged from the actuator plate, the limit switch is turned to its "off"-position.

More specifically, the follower roller 30 of switch 29 is brought into contact with the actuator 13 when the channel member 12 is shifted in the right-hand direction by means of the motor-driven lead screw 8 which shifting takes place to initiate directly in advance of a complete opening of the door 4. This contacting condition will be continued even after the completion of the door opening. When the channel member 12 is caused to move in the reverse or left-hand direction when seen in FIG. 1, more specifically in the door-closing direction, the said contacting condition will become interrupted.

Electrical leads from motor 5 and limit switch 29 are connected to the relay contacts of a change-over relay assembly 35 and the stationary contacts of a change-over switch 34, on the one hand, D.C.-power source such as a stack of batteries 33, on the other hand, preferably an accumulator, as will be more fully described with reference to FIG. 5. When the change-over switch 34 is operated in the manner as will be described hereinafter, the rotation of motor can be reversed in one direction or another, thereby the pusher rod 17 being urged to move in the right-hand or left-hand direction in FIG. 1, as the case may be, so as to open or close the door 4.

In the case of door-opening operation in the above-mentioned sense, the motion-transmitting channel 12 will provide a pull to the cable 23 for drawing the lock lever 25 so as to release the door lock. On the contrary, when the door is closed, the lock lever 25 is actuated in the reverse direction by the urging force transmitted thereto through the intermediary of cable 23, so as to override the lock which is fixedly mounted on the door although not shown, for recovering the locked condition of the door, as is commonly known.

The electrical circuit employed in the aforementioned embodiment will be described hereinbelow in consultation with FIG. 5.

The main components of this circuit are accumulator 33; change-over switch 34; change-over relay arrangement 35 comprising resistors 96 and 98; armature 36 and first and second field coils 37 and 38 of the motor 5; and limit switch 29.

Figures 9, 11:
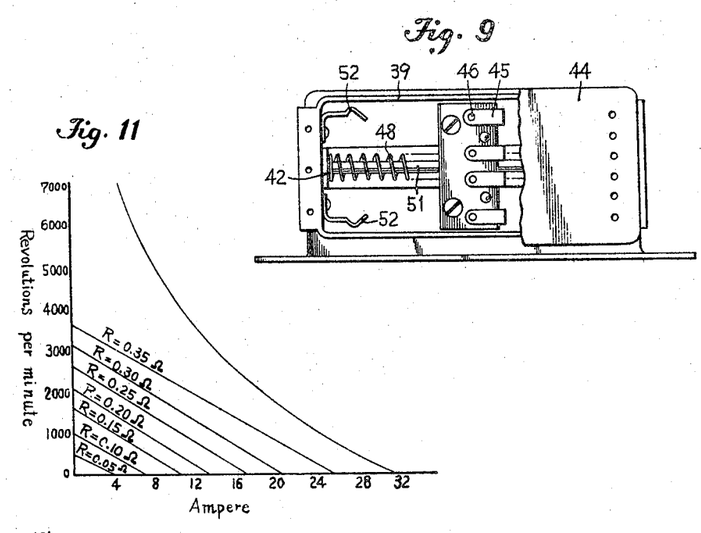
FIG. 9 is a bottom view, partially broken away, of the switch.
FIG. 11 is a diagram of the revolutions per minute of the electric motor plotted against the armature current.
Figures 10, 12:
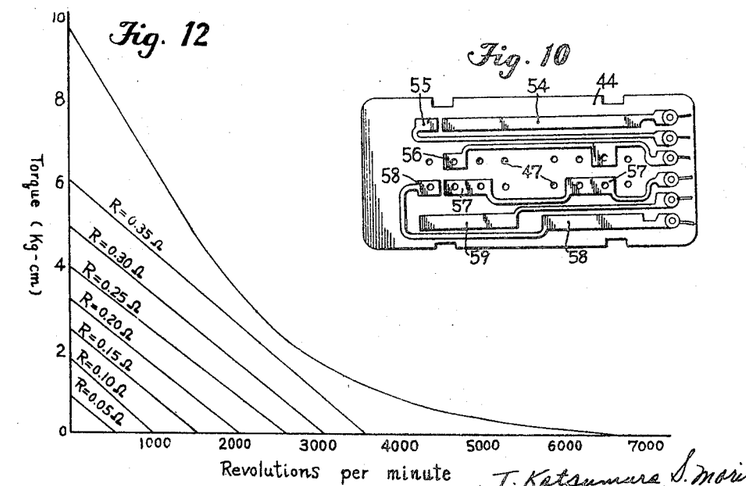
FIG. 10 is a plurality of stationary contact strips fixedly mounted on the upper surface of the base of the housing of the aforementioned switch.
FIG. 12 is a diagram of the revolutions per minute of the motor plotted against the motor torque.

The change-over switch 34 is illustrated more specifically in FIGS. 6–10. As shown, this switch comprises a housing 39, a shiftable, finger-operated manipulating member 40, a slide piece 41 rigidly connected therewith, a pair of guide plates 42 and 43 and a base plate 44 completing the switch case in combination with the housing 39, the base plate carrying fixedly thereon a plurality of stationary electrical contacts as shown in FIG. 10. The slide 41 is provided with a plurality of resilient movable contacts 45 for cooperation with the stationary contacts, as will be more fully described hereinafter. Movable contacts 45 are provided with respective half-ball members 46 so as to cooperate with recesses 47 formed in the upper surface of base plate 44, for precisely determining any selected one of predetermined positions of the manipulating assembly 40–41.

Longitudinally of the housing 39 of switch 34, there is fixedly mounted an elongated pin 51 which is rigidly attached at both its extremities to both end walls of housing 39, said guide plates having respective extensions provided with reception openings slidably receiving the pin 51. Between these extensions and around the pin 51, there is provided an elongated coil spring 48 kept under compression.

Figure 6:
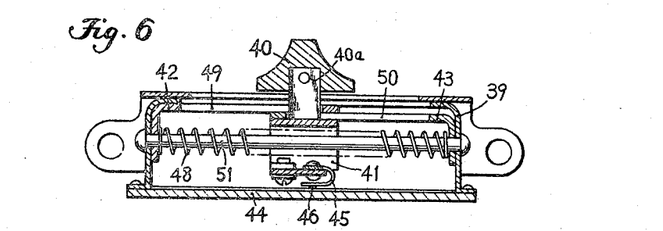
FIG. 6 is a longitudinally sectional view of an electrical switch employed.

As most clearly seen from FIG. 6, guide plates 42 and 43 are in the form of elongated angles, their longer or horizontal arms being longer than one half the length of the switch housing 39 and arranged in parallel with the ceiling or upper wall thereof. The ends of these horizontal arms of the guide plates are arranged in an overlapped relation with each other a small distance as shown in FIG. 6, and formed with respective slots 49 and 50, thereby squeezing in a stepped manner a depending extension 40a of manipulating piece 40 between the end portions of the horizontal arms of guides 42 and 43.

It will thus be clear that when the manipulating piece 40 is shifted in the left- or right-hand direction in FIG. 6 by exerting a slight finger pressure upon the piece, either the right-hand or left-hand guide 42 or 43 is moved in unison therewith, so as to further compress the spring 48. When the finger pressure thus exerted upon the manipulating piece is released, the relative position between the guides 42 and 43, shown in FIG. 6, will be recovered under the influence of the compressed spring 48.

As most clearly seen in FIG. 9, there are provided a pair of spring stops 52 fixedly attached to the inside wall surface of housing 39 and adapted for engagement with respective openings 53 formed in the slide 41.

Figures 4, 7, 8:
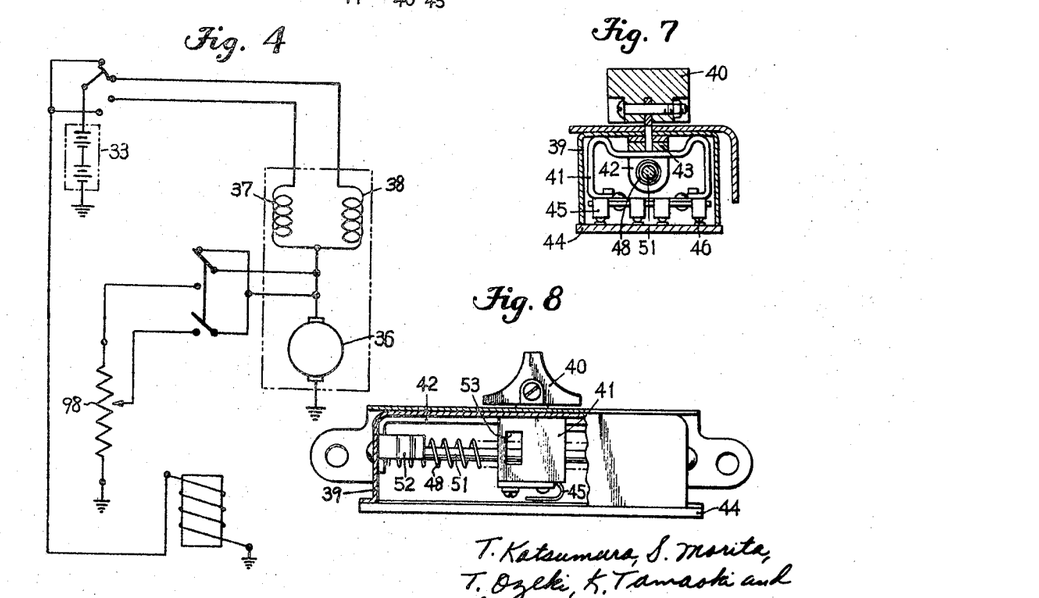
FIG. 4 is a basic circuit diagram comprising main electrical parts included in the actuator.
FIG. 7 is a cross-sectional view thereof.
FIG. 8 is a side view, partially broken away, of the switch.
Figure 5:
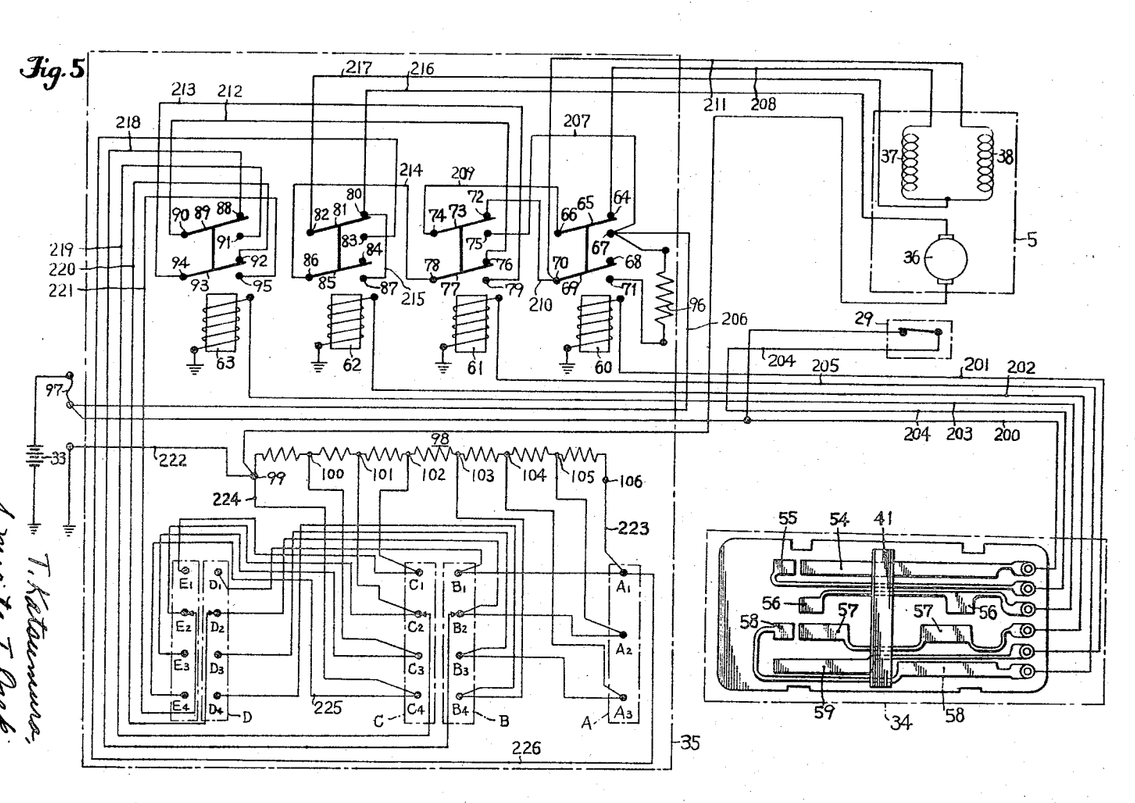
FIG. 5 is a detailed circuit diagram showing additionally further electrical parts of the actuator.

With the slide 41 positioned at the central position of its shiftable range, as shown in FIGS. 6 and 8, movable contact 45 is kept in contact only with stationary contact strip 54 which is connected in turn through lead 200 and safety fuse 97 to the positive pole of D.C.-current source 33 (refer to FIG. 5).

When the manipulating member 40 together with slide 41 is shifted manually in the left-hand direction or the door-opening direction in FIGS. 1 and 6, stationary contacts 54 and 59 are electrically connected with each other through the intermediary of the said movable contact, the stationary contact 59 being electrically connected to a first or door-opening relay 60 through a lead 20, as shown in FIG. 5 and thus the relay being energized. With the slide 41 further shifted in the same direction, a second or first-stage function economizer relay 62 is energized through the intermediary of lead 202 which is connected electrically to stationary contact 57, the latter being now connected to the current source 33 through the movable contact 45. In this case, the former stationary contacts 54 and 55 are still kept in their energized condition as before.

With the slide still further shifted in the same direction, the current source 33 is kept in electrical connection with the aforementioned stationary contacts 54, 59 and 57 as before, and at the same time brought into connection with a further stationary contact 56 through the intermediary of the movable contact 45, the last-mentioned stationary contact 56 being kept in electrical connection with a third relay or second stage function economizer relay 63 via a lead 203.

With the said slide shifted in the same direction still further, the movable contact 45 is so positioned that stationary contacts 55, 58 and 59 are connected, said contact 55 being electrically connected through a lead 204 to limit switch 29.

On the contrary, when the manipulating member 40 and slide 41 are moved in unison in the reverse or right-hand direction from the neutral position shown in FIG. 6, stationary contacts 54 and 58 are brought into electrical connection with the current source 33, the contact 58 being permanently connected through a lead 205 to a door-closing relay 61 (FIG. 5).

With the slide 41 still further shifted in the same direction by means of the manipulating member 40, a first stage function economizer relay 62 is also brought into energization through the intermediary of the now energized stationary contact 57. With the slide 41 further shifted in the same direction, stationary contact 56 is further brought into energization, and thus the second economizer relay 53 is energized. With the slide still further shifted in the same direction, contacts 54 and 58 are brought into electrical connection with the current source 33.

With the manipulating member 40 of change-over switch 34 kept in its neutral or central position shown in FIG. 6, and thus relays 60–63 are kept in the non-energized position, movable relay contact 65 is kept in cooperation with stationary contact 64; contact 69 with contact 68; contact 73 with contact 72; 77 with 76; 81 with 80; 85 with 84; 89 with 88; and 93 with 92; respectively, as clearly shown in FIG. 5.

Relay contact 67 permanently connected through a lead 206 and safety fuse 97 with the current source 33 is further kept in permanent connection with a relay contact 71 through resistor 96 and still further with contact 75 through a connecting lead 207. Contact 64 is permanently connected through a lead 208 to the first field winding 37. Contact 66 is connected via lead 209 to contact 74. Contact 70 is connected via lead 210 to contact 72 and via lead 211 to the second field winding 38, respectively. Contact 76 is connected via lead 212 to contact 90, while contact 79 is connected via lead 213 to contact 94. Contact 78 is connected via lead 214 to contact 86, while contact 80 is connected via lead 215 to contact 87 and via lead 216 to the armature 36 of the motor 5, respectively. Contact 82 is connected via a common lead 217 to the field windings 37 and 38.

Contacts 83, 88, 91, 92 and 95 are connected through respective leads 226, 218, 219, 220 and 221 to plug-in contacts A1, B2, C2, D2 and E2 which are kept in permanent connection with several taps provided along the resistor 98, as will be more fully described hereinafter. End terminal 99 of this resistor is permanently connected through a lead 222 and the mass to the negative pole of the current source 33, while another end terminal 106 of the resistor 98 is permanently connected through a lead 223 to the plug-in contact A1 adapted for the establishment of electrical connection through a lead 226 and contact 83 with the field windings. Terminal 99 of resistor 98 is further connected permanently with plug-in contacts C4 and E4 by means of leads 224 and 225, and a plurality of taps 100–105 are provided along the same resistor, of which those denoted by 100–102 are connected to plug-in contacts C3–C1 and E3–E1, respectively.

The remaining intermediate taps 103–105 are connected permanently with contacts B4, A3 and A2, respectively. Contact B4 is connected with contact D4, while contact A3 is connected with B3 and D3. Contact A2 is connected to contacts B2 and D2, while contact A1 is connected with contacts B1 and D1.

Contacts A1–A3 grouped as "A" in FIG. 5 are plug-in contacts adapted for the connection of the resistor 98 with the field windings 37–38. Contacts B1–B4 grouped as "B" in FIG. 5 are plug-in contacts, adapted for serving to reduce the strongest armature current of the motor 5 as in the case of operation as a series-wound motor to a medium value in the door-opening operation. Contacts C1–C4 grouped as "C" in FIG. 5 are plug-in contacts which serve similarly in the case of door-opening operation to reduce the armature current to a still weaker value. Contacts D1–D4 belonging to a group "D" in FIG. 5 are permanently connected with those grouped as "B" as shown, and serve in the case of door-closing operation to set the armature current to a medium value in comparison with the strongest current value which is obtainable when the motor acts as a series-wound one.

Contacts E1–E4 grouped as "E" in FIG. 5 are similarly a group of plug-in contacts electrically connected with those belonging to the contact group "C," serving for reducing the armature current from the medium to a weaker value, when necessary, in the course of the door-closing operation.

The selection of the medium or weaker armature current in the above-mentioned sense can be determined by selecting a corresponding one of the plug-in contacts belonging to the above-mentioned group 'A," thereby to establish a desired resistance value of the circuit including the field windings 37–38 and armature 36. This selection is made so as to obtain a proper door-opening and closing speeds, as well as the necessary torque required therefor, in order to meet the occasional size of the car, to which the door engine according to the invention is fitted.

Now assuming that the resistance value as measured at the respective tapping points 99–106 arranged along the resistor 98 be 0; 0.05; 0.10; 0.15; 0.20; 0.25; 0.30 and 0.35 ohms, respectively, and that contact 83 is connected to contact A1; contact 88 to contact B2; contact 91 to contact C2; contact 92 to contact D2; and contact 95 to contact E2. When the slide 41 of switch 34 is manipulated to shift in the left-hand or door-opening direction in FIG. 5 under these connections, stationary contact 54 is brought into connection with contact 59, and currents are thus supplied from the source 33 to the door-opening relay 60, thereby the movable contact 65 being brought into engagement with contact 67 and similarly the movable contact 69 being brought into cooperation with contact 71. These established connections result in an establishment of an electric circuit comprising: current source 33, contacts 67, 65, 66, 74, 73, 72 and 70, second field winding 38, contacts 82, 81 and 80 and armature 36, which results in the energization of motor 5 as a series-wound motor.

When the slide 41 is further shifted in the same direction by means of the manipulating member 40 contacts 54, 59 and 57 are connected in circuit, thereby the first operation economizer relay 62 is energized in addition to the door-opening relay 60. Thus, the movable contact 81 is connected with contact 83; and contact 85 with contact 87; thereby currents flowing from the source 33 through contacts 67, 65, 66, 74, 73, 72 and 70, second field winding 38, contacts 82, 81 and 83, contact A1 to tap 106 of the resistor 98. In this case wherein door-opening relay and first economizer relay 62 are kept in operative condition, the armature is kept alive by way of the connecting lead 218 which extends between contact 88 and B2, while plug-in contacts C2, D2 and E2 are kept interrupted. Therefore, currents coming from field winding 38 to the tap 106, are led to tap 105, thence through contacts B2, 88, 89, 90, 76, 77, 78, 86, 85, 87, 80 further to the armature 36. In this case, a part of the current is led to flow through the resistor 98 to the negative pole of current source 33, thus the rotational speed of motor 5 being at a reduced value from the preceding operational mode of series-wound motor (refer to also FIG. 11).

When the slide 41 is still further shifted in the left-hand direction by means of the manipulating member 40, contacts 54, 59, 57 and 56 are connected in circuit, thereby relays 60, 62 and 63 being kept energized. In this case, movable contacts 89 and 93 are brought into cooperation with contact 91 and 95, respectively. Thus, currents will flow from current source 33, through contacts 67, 65, 66, 74, 73, 72 and 70, second field winding 38, contacts 82, 81, 83 and A1 to the tap 106. There is only one plug-in contact C2 which is connected with the armature 36.

Currents flowing from the field winding 38 to the tapping point 106 will be conveyed through tap 101, contacts C2, 91, 89, 90, 76, 77, 78, 86, 85, 87 and 80 to the armature 36. A part of the current will flow through the resistor 98 to the negative pole of the current source 33 and the rotating speed of the motor 5 will be further reduced to a certain minimum in comparison with that of the series-wound motoring mode thereof.

If the switch 34 is shut off after a complete opening of the car door in the aforementioned way under such a condition that the car has been parked on a elevatingly sloping road the door may frequently be brought into closure under the influence of the gravity action. In order to avoid this unintentional closure of the door, a counter torque just opposing the gravity action can be exerted by the motor 5 in the arrangement according to this invention.

More specifically, the slide 41 is shifted to the left-hand extreme position after a complete opening of the door while keeping the switch 34 alive by manipulating the member 40, recesses or openings 53 in the slide 41 are brought into cooperative engagement with spring stops 52, thus the slide being kept in its extreme end position along this left-hand movable range.

On the other hand, the motion-transmitting channel 12 is shifted in the right-hand or door-opening direction in FIG. 1 in the course of the aforementioned opening operation, thereby the follower roller 30 on the limit switch 29 is brought into cooperative engagement with the actuating projection 13 on channel 12, thereby the limit switch being brought into operation. Therefore, currents will flow from the current source 33 through the limit switch 29 to the stationary contact 55 of change-over switch 34. Upon the positioning of slide 41 at its left-hand extreme position in the aforementioned way, the contacts 55, 58 and 59 are connected in circuit, and thus, movable contact 65 and 69 are brought into cooperation with contacts 67 and 71, respectively. At the same time, movable contacts 73 and 77 are brought into cooperation with contacts 75 and 79, respectively. Currents will therefore flow from current source 33 through contact 67, resistor 96, contacts 71, 69 and 70, second field winding 38, contacts 82, 81 and 80 to the armature 36. The motor current will be therefore in this case reduced to a properly selected minimum value through the intermediary of resistor 96, thereby developing a counter motor torque for effectively preventing the unintentional gravity closure of the door.

In this case, such a case should take place wherein 31 the driver may operate the door manually to close when he deems the change-over switch has been interrupted upon the complete opening of the door. In such a case, currents will continue to flow through the motor upon closure of the door and a considerable loss of electric current would be invited. In the door engine as constructed in accordance with the novel inventive teaching, the follower roll 30 of limit switch 29 is caused to disengage from contact with the actuator projection 13 on the channel 12, simultaneously with the initiation of the door closing operation, thus the limit switch is turned to "off" and the stationary contact 55 is shut off from the current source 33, thereby preventing effectively the aforementioned superfluous current conduction through the motor 5.

When the slide 41 of the change-over swtich 34 is shifted in the right-hand or door-closing direction in FIG. 5, contacts 54 and 58 are brought into electrical connection with each other, and thus, movable contacts 73 and 77 are connected with contacts 75 and 79, respectively. Currents will flow therefore from current source 33 through contacts 67, 75, 73, 74, 66, 65 and 64, first field winding 37, contacts 82, 81 and 80 to the armature 36. Thus, in this case, the motor will operate as a series-wound motor.

When the slide 41 is further shifted manually in the same direction, stationary contacts 54, 58 and 57 are connected in circuit, thus currents flowing from the current source 33 through 67, 75, 73, 74, 66, 65 and 64, first field winding 37, contacts 82, 81, 83 and A1 to tapping point 106.

In this case wherein door-closing relay 61 and first economizer relay 62 are kept energized, there is only a conducting lead 220 extending between contacts D2 and 92, for making the armature 36 in its energized condition. Thus, currents flowing from field winding 37 through tap 106 will be further conveyed through tap 105, contacts D2, 92, 93, 94, 79, 77, 78, 86, 85, 87 and 80 to armature 36, while a part of the current will flow through resistor 98 to the negative pole of the current source. Therefore, the rotational speed of the motor will be reduced from that corresponding to the series-wound motoring mode (also, refer to FIG. 11).

When the slide 41 is further shifted in the right-hand direction in FIG. 5, stationary contacts 54, 58, 57 and 56 are connected in circuit, thereby the relays 61, 62 and 63 being brought into energization. Movable contacts 89 and 93 are brought into cooperation with contacts 91 and 95, respectively. Currents will therefore be caused to flow from current source 33 through contacts 67, 75, 73, 74, 66, 65 and 64, first field winding 37, contacts 82, 81, 83 and A1 to tapping point 106. In this case wherein door-closing relay 61 and first and second economizer relays 62 and 63 are kept in energization, only one of the plug-in contacts at E2 is electrically connected to the armature 36.

Currents will therefore flow through tap 101, contacts E2, 95, 93, 94, 79, 77, 78, 86, 85, 87 and 80 to armature 36, while a part of the current is conveyed through resistor 98 to the negative pole of the current source 33, whereby the rotational speed of the motor 5 will be reduced to a predetermined minimum value in comparison with that in the case of the series-wound motoring operational mode (also, refer to FIG. 11).

Finally, when the slide 41 is positioned at the right-hand extreme position when seen in FIG. 5, the wiring connection similar to that which is established in the initiating period of the door closure, is realized, so that only the stationary contacts 54 and 58 are brought into electrical connection, thereby the motor being caused to operate as a series-wound one.

In the following, the aforementioned operating modes will be described in a more generalized theoretical way:

Generally speaking, the rotational speed, when expressed by N, of a D.C. electric motor may be represented by the following equation:

$$N = \frac{Ec}{K_1\phi}$$

where, $Ec$ is the counter-electromotive force of the armature; $K_1$ is a constant, and $\phi$ denotes field magnetic fluxes.

When the above formula is applied to the electric circuit employed in the so far described embodiment of the present invention, and N is assumed to be the rotational speed of the motor acting as a series-wound one, then $$N = \frac{Et - Ia(Rf + Ra)}{K_1\phi} \quad (1)$$

where, $Et$ is the impressed voltage upon the motor; $Ia$ is the armature current; $Rf$ is the resistance through the field windings, and $Ra$ is the resistance through the armature.

In the case of series-wound motor, the armature current flows also through field windings and the field fluxes and the field fluxes are in proportion with the armature current $Ia$. When, therefore, the load is reduced and the armature current is thereby lowered, the motor speed N will rise correspondingly and in an abrupt way.

When the slide 41 is shifted in the left or right in FIG. 5 in the aforementioned way, so as to bring stationary contact 59 or 58, and further contacts 57 and 56 in circuit, thereby resistors being inserted between the field windings, on the one hand, and the armature, on the other hand, the motor speed, when expressed by N′, will be:

$$N' = \left[Et - Ia'\left\{(Rf + Ra) + R_1 + \frac{Rf + R_1}{R_2}\right\}\right] \times \frac{R_2}{R_1 + R_2 + R_f} \times \frac{1}{K_1\phi'} \quad (2)$$

where:

$Ia'$ = armature current in this case;
$R_1$ = resistance from a tap on resistor 98 kept in connection with field windings, to a further tap on said resistor kept in connection with armature;
$R_2$ = resistance from a tap on resistor 98 kept in connection with armature, to a further tap leading to the negative pole of current source; and
$\phi'$ = field fluxes.

When the resistance $R_1 + R_2$ distributed over the whole length ranging the opposite terminal taps 99–106 so as to saturate the field fluxes $\phi'$, the motor speed N′ can be maintained at a constant value, regardless of occasional variation of the armature current $Ia'$.

When comparing the Formula 1 with that denoted by (2) in the foregoing, the following relation can be observed:

$$(Rf + Ra) < (Rf + Ra) + R_1\frac{Rf + R_1}{R_2} \cdot \frac{1}{K_1\phi} \geqq \frac{1}{K_1\phi'} = \text{constant}$$

Since $$\frac{R_2}{R_1 + R_2 + R_3} < 1$$

in Formula 2, it can be easily seen that even when the armature current $Ia'$ is reduced with a reduced load, the increase of motor speed may be negligibly small and kept at a slower value. This tendency is contrary to the tendency in the series-wound motoring mode as expressed by Formula 1 (see also FIG. 11).

Now studying the torque relation of the motor, it can be expressed generally by the following formula:

$$T = K_2 \cdot \phi \cdot Ia$$

where, T = motor torque, and $K_2$ = a constant.

It will be thus be seen that the motor torque varies with the product, $\phi \times Ia$.

When the motor 5 acts as a series-wound one, the above torque equation will apply. Therefore, when the load is reduced and thus the armature current drops, resulting in a corresponding increase of the motor speed, the motor torque will become reduced in an abrupt way (refer to FIG. 12).

When resistors are inserted as in the aforementioned way between the field windings and the armature, and the motor torque is expressed by T′, then:

$$T' = K_2 \cdot \phi' \cdot Ia'$$

Therefore, by selecting the resistance $R_1 + R_2$ to be a properly selected value, the field fluxes $\phi'$ can be kept at a predetermined maximum value, regardless possible variation of the armature current $Ia'$. Thus, in this case, the torque reduction can be maintained at a small value, even when the load is reduced and the armature current correspondingly drops, resulting in an increased speed of the motor. This relation can be also easily understood by reference to FIG. 12.

Now turning to the braking operation provided by the motor 5. With resistors inserted between the field windings and the armature by manipulation of change-over switch and upon energization of charge-over relay arrangement as in the aforementioned way, the speed and the torque of the motor 5 will become those denoted by N' and T', respectively, in the foregoing. Now assuming that N is larger than N', the motor will act as a generator during the transient period ranging from the speed N to N'. In this case, the both ends of the resistor are connected with the armature 36, thus providing a sudden braking action.

Figure 13:
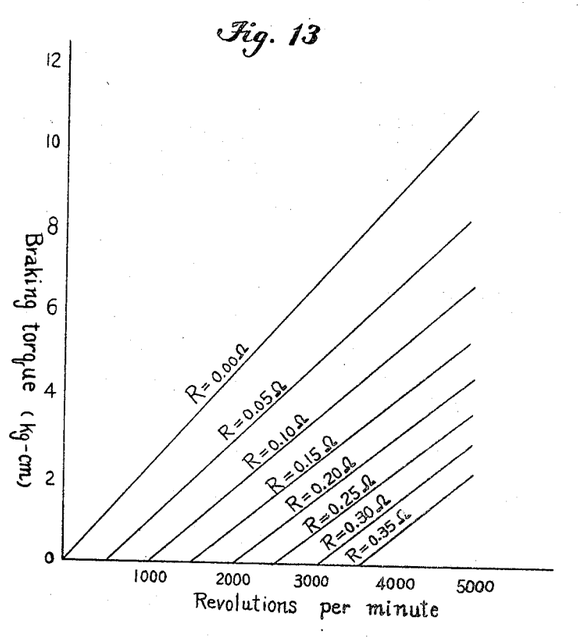
FIG. 13 is a diagram of the revolutions per minute of the motor plotted against the braking force with various resistances included in the motor circuit.

FIG. 13 illustrates the above-mentioned braking operation of the motor, during increase of the speed, N, 5000 r.p.m. as an example, to N'.

Upon braked in the abovementioned way, the armature 36 will continue to run at the specified speed N' with the corresponding torque T'. When a certain external force such as the accelerated door speed is impressed and a tendency for increasing the motor speed is likely to take place, the aforementioned current-generating damping action will be invited and thus a braking force in the reversed direction to that described hereinabove corresponding to several curves shown in FIG. 13 will be induced, thereby the rotational speed of the motor being kept nevertheless substantially at a predetermined value.

Finally, the operation of the door lock will be described more in detail hereinbelow:

When the change-over switch 34 is manipulated so as to energize the motor 5, rotation will be transmitted therefrom to the lead screw 8 and the mating nut member 10 is caused thereby to shift in the right-hand direction when seen in FIG. 1, urging channel 12 and cylinder 14 with anchoring member 16 to shift in the same direction. Since the pusher rod 17 is fixedly attached to the chassis 1 by means of fixture 22, it cannot be accompanied by the shifting movement thus provided, resulting in a further compression of the spring 18 in the cylinder 14, if the door lock should not be tripped for releasing. With the channel 12, cylinder 14 and anchoring member 16 shifted in the right-hand direction in FIG. 1, stopper rod 24 is brought into abutment with the left-hand end wall of slot 15 formed in the member 16, while spring 18 is further compressed under the influence by the rotation of the motor. With this operation further continued, a gap is formed between bracket 21 and member 16, and, then this gap will be progressively enlarged, thereby cable 23 being subjected to a pulling effort and in turn exerting a pull on the lock lever 25 for releasing the door lock. In this way, the car door is unlocked, whereupon instantly the accumulated resilient force in the spring 18 is released to urge the door to shift in the opening direction which action is assisted considerably by the toggle action of the pusher rod 17 abutting at its one end against the chassis 1. The door lock can not be released, unless the lock lever 25 is subjected to a pulling effort in the door-opening direction. On the contrary thereto, the lock lever is designed and arranged so as to be freely rotatable in the door-closing direction. When the motor is caused to rotate in the reverse direction by the manipulation of change-over switch 34 without providing a pulling effort to cable 23, the door is automatically opened and the lock is brought into its operating position.

In the comparative conventional door engine, the cable as at 23 in the foregoing and adapted for drawing the lock lever as at 25 is fixedly attached to a cylindrical member as at 14, or the like. In such an arrangement, it is also possible at the initiating moment of door-opening to trip releasingly the door lock by pulling the lock lever. Upon the release of the door lock and in the course of continued door-opening operation, the channel 12 is also caused to shift in the right-hand direction, when seen in FIG. 1, under the influence of rotation of the drive motor as at 5, and thus the spring as at 18 housed in a cylindrical member as at 14 is compressed and the cable 23 exerts during the whole period of this door-opening operation a pull upon the lock lever, so far as the pusher rod is in its operating condition for opening the door. Under this kind of operating condition, damage or breakage of the cable will be frequently encountered.

On the other hand, when gravity or unintentional some or other external accelerating force is applied to the door in the course of its closing operation and thus the closing speed should exceed the value provided by the operation of the motor, motion will be transmitted in the reverse direction, or more specifically from the pusher rod into the channel 12, slide 10 and the like, thereby the spring 18 being further compressed and a gap being established between bracket 21 and anchoring member 16. This phenomenon will invite a pull which is applied to the cable 23, resulting in the lock lever subjected to a pulling effort and in a release of the door lock. This will result in a failure of the door locking and a repeated operation of the door engine in its closing direction would be necessary to carry out again.

In the embodiment of the invention so far described, stopper rod 24 forming the motion-receiving end of cable 23 is normally kept stationary substantially at the central point between the both extremities of slot 15. Only when the spring 18 is further compressed beyond a predetermined degree, the stopper rod 24 is brought into engagement with the left-hand end of the slot 15 (see FIG. 3), and subjected to a pulling effort in the aforementioned way, for tripping the door lock. In other words, the spring 18 is subjected to the compressing effort until the lock lever 25 is pulled through the intermediary of cable 23, thus the aforementioned drawback in the conventional arrangement which would result in a failure of the door-lock operation, can be effectively remedied.

It will be understood that modifications and variations may be effected without departing from the scope of the novel concepts of the present invention.

What we claim is:

1. A door actuator arrangement, comprising a D.C.-drive motor having field windings and an armature and adapted to be mounted within the interior of the door, a current source for feeding said motor, motion-converting means connected to the motor for the conversion of the rotational movement of the motor into a linear motion, a transmission mechanism linked with said means and transmitting said converted linear motion to the door for opening and closing the latter, a multi-contact multi-position switch assembly electrically connected between said motor and said current source, a plurality of relays electrically connected with the contacts of said switch, and a multi-stage resistor connected between said field windings and said armature, said switch assembly, resistor and relays being connected for making the armature current supplied from said current source the strongest when the switch is manipulated to a first position in the door-opening direction at the initiation of the door-opening and then the armature current is weakened when the switch is moved to at least one subsequent position.

2. A door actuator arrangement as claimed in claim 1, further comprising a set of additional contacts in said switch and an additional resistor connected between said current source and said motor, the additional contacts and resistor being connected so that when the switch is manipulated to said additional contacts in the door-opening direction, the motor current is caused to flow through said additional resistor and is thus weakened to a degree for preventing unintentional door-closing by gravity and other causes.

3. A door actuator arrangement as claimed in claim 2 in which said switch includes means for retaining said switch in the position in which said additional contacts are connected with said additional resistor, said means comprising spring loaded retaining members at the position corresponding to said additional contacts, said switch having a movable member having openings therein in which said spring loaded retaining members engage for holding said movable member in said position.

4. A door actuator as claimed in claim 1 in which said switch comprises a fixed base having a plurality of contacts thereon, a slide contact movable over and in contact with said fixed contacts, guide plates extending along said contacts, the ends of said guide plates overlapping at the center point of said switch in which said switch is open, said guide plates each having an elongated slot therein extending away from the said center point, the ends of said slots overlapping, a pin on said slide contact extending through said slots, and a spring means extending beneath said guide plates and being compressible in the direction of the length of said slots between the free ends of said guide plates, whereby said slide contact can be moved in either direction and the spring will be compressed so as to return the slide contact to the center point.

5. A door actuator as claimed in claim 1 in which said switch comprises elongated movable contact movable transversely of its length, and a plurality of fixed contacts spaced along the length of movement of said movable contact and spaced transversely of the direction of length of movement, at least one contact being elongated and extending along the length of movement of said movable contact between a center position and a second position; and the remainder of said contacts extending along less than the full length of movement of said movable contact.

6. A door actuator arrangement, comprising a reversible D.C.-drive motor having field windings and an armature and adapted to be mounted within the interior of the door, a current source for feeding said motor, motion-converting means connected to the motor for the conversion of the rotational movement of the motor into a linear motion, a transmission mechanism linked with said means and transmitting said converted linear motion to the door for opening and closing the latter, a multi-contact multi-position switch assembly electrically connected between said motor and said current source, a plurality of relays electrically connected with the contacts of said switch, and a multi-stage resistor connected between said field windings and said armature, said switch resistor and relays being connected for making the armature current supplied from said current source the strongest when the switch is manipulated to a first position in the door-opening direction at the initiation of the door-opening and then the armature current is weakened when the switch is moved to at least one subsequent position, and for making the armature current the strongest when the switch is manipulated to a first position in the door-closing direction and the rotational direction of said motor is reversed at the initiation of the door-closing, and then is weakened when the switch is moved to an intermediate position and finally is returned to its strongest value when the switch is moved to an extreme position by the door closing direction immediately in advance of complete closure of the door.

7. In a door actuator arrangement having a reversible door moving means, and control means coupled to said door moving means for driving said door moving means in opposite directions for opening and closing the door, that improvement comprising a transmission means for transmitting the motion of the door moving means to the door and comprising a first link member and a second link member slidably engaged with said first link member for sliding movement parallel to the length of said link members, spring means coupled between said link members and compressed when one link member is moved toward the other link member, and latch actuating means adapted to be coupled to latch means on the door and comprising a latch actuating cable, a sheath around said cable, a sheath holding member having the end of the sheath adjacent the link members attached thereto and mounted on one of said link members, a cable actuating member mounted on the other of said link members, and lost motion connection between said cable and cable actuating member.

References Cited
UNITED STATES PATENTS

| | | | |
|---|---|---|---|
| 2,661,945 | 12/1953 | Hamilton | 49—138 |
| 3,154,302 | 10/1964 | Maruyama | 49—280 |
| 3,264,543 | 8/1966 | Yoshida | 318—266 |
| 3,274,732 | 9/1966 | Murakami | 49—280 |

DAVID J. WILLIAMOWSKY, *Primary Examiner.*

J. K. BELL, *Assistant Examiner.*